United States Patent Office 3,775,347
Patented Nov. 27, 1973

3,775,347
COMPOSITIONS FOR MAKING RESISTORS COMPRISING LEAD-CONTAINING POLYNARY OXIDE
Robert Joseph Bouchard, Wilmington, Del., assignor to E. I. du Pont de Nemours and Company, Wilmington, Del.
No Drawing. Continuation-in-part of application Ser. No. 77,309, Oct. 1, 1970, now Patent No. 3,681,262, which is a continuation-in-part of application Ser. No. 880,327, Nov. 26, 1969, now Patent No. 3,583,931, which in turn is a continuation-in-part of abandoned application Ser. No. 692,108, Dec. 20, 1967. This application Mar. 16, 1972, Ser. No. 235,307
Int. Cl. H01b 1/06
U.S. Cl. 252—518          17 Claims

ABSTRACT OF THE DISCLOSURE

Powder compositions which yield resistors having excellent temperature coefficient of resistance characteristics (at middle and high resistivity) comprising, by weight, (1) 20–80% polynary oxide(s) of the formula $$(M_xPb_{2-x})(M'_2)O_{7-z}$$

wherein M is at least one metal selected from the group consisting of yttrium, indium, cadmium, bismuth and the rare earth metals of atomic number 57–71, inclusive; and M' is at least one of ruthenium and iridium, and (2) 20–80% of dielectric material which is a lead silicate or modified lead silicate glass frit.

CROSS-REFERENCE TO RELATED APPLICATIONS

This is a continuation-in-part of U.S. Ser. No. 77,309, filed Oct. 1, 1970 now U.S. Pat. 3,681,262, issued Aug. 1, 1972, which is a continuation-in-part of U.S. Ser. No. 880,327, filed Nov. 26, 1969, now U.S. Pat. 3,583,931; which is a continuation-in-part of U.S. Ser. No. 692,108, filed Dec. 20, 1967, now abandoned.

BACKGROUND OF THE INVENTION

Compositions useful in preparing electrical elements, including resistive elements, conductive elements and heating elements are in great demand. Each type of electrical element requires a different degree of conductivity and/or resistivity. For example, nonconductive materials (e.g., glasses) may be mixed in varying proportions with conductive materials to produce resistor compositions.

Polynary oxides including those of my U.S. Pat. 3,583,-931 have been found useful in resistors, as have the polynary oxides of Sleight U.S. Pat. 3,560,144. Compositions comprising polynary oxides and noble metals are described in Schubert U.S. Pat. 3,560,410 and Hoffman U.S. Pat. 3,553,109.

There is a demand for inexpensive compositions capable of producing resistors exhibiting reproducibility, reliability in operation, maintainability and temperature stability as well as other electrical properties. There is particular demand for compositions which are capable of producing fired resistors having mid-range resistivities (500–100,000 ohms/square) as well as good temperature coefficient of resistance (TCR) characteristics, in the sense that the difference between hot and cold TCR is usually below about 100 p.p.m./° C. Also in demand are resistors having high resistivities (above about 100,000 ohms/square) with similar TCR characteristics.

By "TCR" I mean the difference in resistivity at temperatures $T_1$ and $T_2$, divided by the product of the resistivity at $T_1$ and the temperature difference between $T_1$ and $T_2$ in degrees, the result being multiplied by $10^6$ (the result is p.p.m./° C.). For "hot" TCR, $T_1$ and $T_2$ are $+25°$ C. and $+125°$ C., respectively; for "cold" CTR, $T_1$ and $T_2$ are $-75°$ C. and $+25°$ C., respectively.

SUMMARY OF THE INVENTION

This invention relates to compositions useful for producing resistors, comprising a powdered mixture of (1) 20–80% of one or more polynary oxides of the formula $$(M_xPb_{2-x})(M'_2)O_{7-z}$$

wherein

M is at least one metal selected from the group consisting of yttrium, indium, cadmium, bismuth and the rare earth metals of atomic number 57–71, inclusive;
M' is at least one of ruthenium and iridium;
x is a number in the range 0–1.9; and
z is a number in the range 0–1, being at least equal to about x/2 when M is a divalent metal, and (2) 20–80% of dielectric material (all percentages by weight).

Preferred polynary oxides in this invention are those where M is bismuth. The dielectric material is a lead silicate or modified lead silicate glass frit (i.e., a lead silicate containing optional glass forming oxides). At least 50% PbO and at least 14% $SiO_2$ are present in the frit, along with 0–30% optional glass forming oxides from among $Al_2O_3$, $B_2O_3$, $TiO_2$, $ZrO_2$, CdO, ZnO and $P_2O_5$. Preferred frits comprise 50–85% PbO, 14–45% $SiO_2$, 1–15% $Al_2O_3$, and 0–15% of one or more of $B_2O_3$, $TiO_2$, $ZrO_2$, CdO, ZnO and $P_2O_5$. Optimum frits comprise 60–70% PbO, 24–37% $SiO_2$, 1–10% $Al_2O_3$ and 0–10% of the latter optional oxides.

Such compositions may be dispersed in a liquid vehicle, preferably inert, to provide a paint or paste that can be applied to a surface of a dielectric substrate; however applied, the composition is then fired to form a stable electrical element.

DETAILED DESCRIPTION

The compositions of this invention comprise 20–80% by weight of polynary oxide(s) and 20–80% by weight of dielectric material, exclusive of vehicle, preferably 25–75% polynary oxide(s) and 35–65% dielectric material.

The essence of this invention lies in the inclusion of lead-containing polynary oxide(s) in the resistor compositions. It is pointed out that the term "an oxide" designates pyrochlore-related oxides, including multi-substitued oxides (e.g., $Pb_{1.5}Bi_{0.5}Ru_2O_{6.25}$, $Pb_{1.5}Cd_{0.5}Ru_2O_6$, $$Pb_{1.5}Eu_{0.5}Ru_2O_{6.25},$$

$Pb_{1.5}Cd_{0.5}Ru_{1.5}Ir_{0.5}O_6$) as well as mixtures of said oxides (substituted or unsubstituted). When polynary oxides and dielectric materials (e.g., glass binder) are fired under conventional conditions (e.g., 650–950° C.), any tendency of the polynary oxide to react is minimized; the polynary oxide remains as an integral part of the fired resistor. This invention relates not only to the above described powder compositions and resistors formed therefrom, but also to resistors having the prescribed components, said components having been formed in situ during firing to form the resistor.

The proportions of the components can be varied considerably. Generally, the resistor compositions must comprise from 20–80% of a polynary oxide(s) and 20–80% dielectric material. The weight ratios of these components to each other have an effect on the resistance and the temperature coefficient of resistance; in addition, they also have an effect on the smoothness of the fired resistors, moisture stability, noise level and drift. Furthermore, the type of polynary oxide(s) and dielectric material will also effect these properties.

The dielectric material serves to bind the polynary oxide(s) to the substrate, and is a glass frit generally prepared by melting a glass batch composed of the desired metal oxides, or compounds which will produce the glass during melting, and pouring the melt into water. The coarse frit is then milled to a powder of the desired fineness. Frit compositions used as binders in the compositions of this invention are lead silicates and modified lead silicates such as lead borosilicates, lead aluminosilicates, and lead aluminoborosilicates. Minor components of the frit other than PbO and $SiO_2$ (up to about 30% of total frit) may include CdO, $TiO_2$, ZrO, $P_2O_5$, ZnO, $Al_2O_3$ and $B_2O_3$.

The resistor compositions of the invention will usually, although not necessarily, be dispersed in an inert vehicle to form a paint or paste for application to various substrates. The proportion of vehicle to resistor composition may vary considerably depending upon the manner in which the paint or paste is to be applied and the kind of vehicle used. Generally, from 1–20 parts by weight of resistor composition [oxide(s) and dielectric material] per part by weight of vehicle will be used to produce a paint or paste of the desired consistency. Preferably, 2–6 parts per part of vehicle will be used.

Any liquid, preferably inert, may be employed as the vehicle. Water or any one of various organic liquids, with or without thickening and/or stabilizing agents, and/or other common additives, may be utilized as the vehicle. Examples of organic liquids that can be used are the higher alcohols; esters of such alcohols, for example the acetates and propionates; the terpenes such as pine oil, alpha- and beta-terpineol and the like; and solutions of resins such as the polymethacrylate esters of lower alcohols, or solutions of ethyl cellulose, in solvents such as pine oil and the monobutyl ether of ethylene glycol monoacetate. The vehicle may contain or be composed of volatile liquids to promote fast setting after application; or it may contain waxes, thermoplastic resins or the like materials which are thermofluid so that the vehicle-containing composition may be applied at an elevated temperature to a relatively cold ceramic body upon which the composition sets immediately.

The resistor compositions are conventionally made by admixing the components in their respective proportions. Additionally, one part of the vehicle for every 1–20 parts of solids mentioned above may be admixed. Then the resistor composition is applied to a substrate (e.g., ceramic body) and fired to form a stable resistor.

Application of the resistor composition in paint or paste form to the substrate may be effected in any desired manner. It will generally be desired, however, to effect the application in precise pattern form, which can be readily done by using well-known screen stencil techniques or methods. The resulting print or pattern will then be fired in the usual manner at a peak temperature in the range of about 650–950° C., in an air atmosphere employing a standard furnace.

The invention is illustrated by the following examples. In the examples and elsewhere in the specification and claims, all parts, ratios and percentages of materials or components are by weight.

EXAMPLES 1–11

A number of lead-containing polynary oxide/glass resistor compositions were made and tested. The oxide used in each example is identified in Table 1, and the glass frit in Table 2. The resistor compositions were prepared by mixing 64 parts polynary oxide and 36 parts glass, each finely divided. The mixture of oxide and glass frit was then mixed with a vehicle consisting of 8% ethyl cellulose and 92% β-terpineol, to provide a suitable consistency. The mixture was then screen-printed through a 165-mesh screen onto an alumina (96% dense $Al_2O_3$) substrate. It should be noted that the dielectric substrate can be composed of many materials that will withstand the firing temperatures necessary to bind the resistor to the substrate.

After the compositions had been applied to the dielectric substrate in uniform thickness, the compositions were dried to remove solvent. The assemblages were then fired in a conventional furnace at 850–900° C./ 10 minute peak cycle over a 45-minute period to produce resistors about 1-mil thick.

Results of resistivity measurements made on the various resistors fabricated by this method are set forth in Table 1. The data show, inter alia, that at middle and high range resistivities (500 or more ohms/square) a low TCR is obtained as well as low difference between hot and cold TCR's (lss than about 100 p.p.m./° C. and often less than 50 p.p.m./° C.).

TABLE 1.—RESISTORS

| Example No. | Polynary oxide | Glass | Resistivity (ohms/square) | TCR (p.p.m./° C.) Hot | TCR (p.p.m./° C.) Cold | Difference |
|---|---|---|---|---|---|---|
| 1 | $Pb_{1.5}Cd_{0.5}Ru_{1.5}Ir_{0.5}O_{6.0}$ | A | 13,500 | +87 | +107 | 20 |
| 2 | $Pb_{1.5}Cd_{0.5}Ru_{1.5}Ir_{0.5}O_{6.0}$ | B | 15,600 | +88 | +87 | 1 |
| 3 | $Pb_{1.5}Cd_{0.5}Ru_{1.5}Ir_{0.5}O_{6.0}$ | C | 4,000 | +130 | +209 | 79 |
| 4 | $Pb_{1.5}Cd_{0.5}Ru_{1.5}Ir_{0.5}O_{6.0}$ | D | 13,200 | +57 | +26 | 31 |
| 5 | $Pb_{1.5}Cd_{0.5}Ru_{1.5}Ir_{0.5}O_{6.0}$ | E | 4,300 | +136 | +180 | 44 |
| 6 | $Pb_{1.5}Cd_{0.5}Ru_{1.5}Ir_{0.5}O_{6.0}$ | F | 5,600 | +160 | +216 | 56 |
| 7 | $Pb_{1.5}Cd_{0.5}Ru_{1.5}Ir_{0.5}O_{6.0}$ | G | 14,800 | +91 | +87 | 4 |
| 8 | $Pb_{1.5}Bi_{0.5}Ru_2O_{6.25}$ | A | 3,800 | +71 | +75 | 4 |
| 9 | $Pb_{1.5}Eu_{0.5}Ru_2O_{6.25}$ | A | 12,400 | +8 | −26 | 34 |
| 10 | $Pb_{1.5}Cd_{0.5}Ru_2O_{6.0}$ | A | 33,900 | −4 | −19 | 15 |
| 11 | $Pb_2Ru_2O_6$ | E | 38,000 | +36 | −36 | 72 |
| 12 | $Pb_2Ru_2O_6$ | H | 45,500 | +94 | +63 | 31 |
| 13 | $Pb_2Ru_2O_6$ | I | 387,800 | +19 | −20 | 39 |
| 14 | $Pb_{1.5}Cd_{0.5}Ru_2O_6$ | I | 1,703,500 | −48 | −93 | 45 |
| 15 | $Pb_{1.5}Cd_{0.5}Ru_2O_6$ | H | 3,269,000 | +21 | −85 | 106 |

TABLE 2.—GLASSES USED IN TABLE 1

| Glass No. | PbO | $SiO_2$ | $Al_2O_3$ | CdO | $TiO_2$ | $ZrO_2$ | $B_2O_3$ | $P_2O_5$ |
|---|---|---|---|---|---|---|---|---|
| A | 62 | 29 | 6 | 3 | | | | |
| B | 65 | 29 | 3 | | 3 | | | |
| C | 62 | 29 | 3 | 3 | | 3 | | |
| D | 60 | 26 | 6 | | 3 | | 5 | |
| E | 65 | 29 | 3 | | | | | 3 |
| F | 62 | 37 | 1 | | | | | |
| G | 68 | 31 | 1 | | | | | |
| H | 65 | 34 | 1 | | | | | |
| I | 65 | 29 | 6 | | | | | |

EXAMPLES 12–15

Resistors were prepared as in Examples 1–11, with varying proportions of polynary oxide to frit:

Example—
 12 _____ 50/50
 13 _____ 36/64
 14 _____ 29/71
 15 _____ 26/74

The particular polynaryl axide and frit used, and the properties of the resultant resistors, are set forth in the tables.

I claim:

1. In a composition for making resistors comprising a powdered mixture of a polynary oxide and dielectric material, the improved composition comprising by weight (1) 20–80% of one or more polynary oxides of the formula

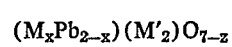

wherein

M is at least one metal selected from the group consisting of yttrium, indium, cadmium, bismuth and the rare earth metals of atomic number 57–71, inclusive;

M' is at least one of ruthenium and iridium;
$x$ is a number in the range 0–1.9; and
$z$ is a number in the range 0–1, being at least equal to about $x/2$ when M is a divalent metal, and (2) 20–80% dielectric material which is a lead silicate glass frit containing at least 50% PbO and at least 14% SiO$_2$, and 0–30% of one or more optional glass-forming oxides from among Al$_2$O$_3$, B$_2$O$_3$, TiO$_2$, ZrO$_2$, CdO, ZnO and P$_2$O$_5$.

2. A composition in accordance with claim 1 dispersed in an inert liquid vehicle.

3. A composition in accordance with claim 1 where M is bismuth.

4. A composition in accordance with claim 3 wherein M' is ruthenium.

5. A composition in acordance with claim 3 wherein M' is iridium.

6. A composition in accordance with claim 1 wherein said oxide is from the group consisting of $Pb_{1.5}Bi_{0.5}Ru_2O_{6.25}$, $P_{1.5}Cd_{0.5}Ru_2O_6$, and $Pb_{1.5}Cd_{0.5}Ru_{1.5}Ir_{0.5}O_6$ 7. A composition in accordance with claim 1 wherein said dielectric material is a lead aluminosilicate glass frit of 50–85% PbO, 14–45% SiO$_2$, 1–15% Al$_2$O$_3$ and 0–15% of one or more glass-forming oxides from among B$_2$O$_3$, TiO$_2$, ZrO$_2$, CdO, ZnO and P$_2$O$_5$.

8. A composition in accordance with claim 7 wherein said glass frit is a lead aluminosilicate of 60–70% PbO, 24–37% SiO$_2$, 1–10% Al$_2$O$_3$, and 0–10% optional glass forming oxides from among B$_2$O$_3$, TiO$_2$, ZrO$_2$, CdO, ZnO and P$_2$O$_5$.

9. A composition in accordance with claim 1 of 25–75% polynary oxide(s) and 35–65% dielectric material.

10. An electrical element comprising an electrically nonconductive substrate having fired thereon a resistor having the composition of claim 1.

11. An electrical element comprising an electrically nonconductive substrate having fired thereon a resistor having the composition of claim 3.

12. An electrical element comprising an electrically nonconductive substrate having fired thereon a resistor having the composition of claim 4.

13. An electrical element comprising an electrically nonconductve substrate having fired thereon a resistor having the composition of claim 5.

14. An electrical element comprising an electrically nonconductive substrate having fired thereon a resistor having the composition of claim 6.

15. An electrical element comprising an electrically nonconductive substrate having fired thereon a resistor having the composition of claim 7.

16. An electrical element comprising an electrically nonconductive substrate having fired thereon a resistor having the composition of claim 8.

17. An electrical element comprising an electrically nonconductive substrate having fired thereon a resistor having the composition of claim 9.

References Cited

UNITED STATES PATENTS

| 3,639,969 | 12/1971 | Popowich | 252—514 |
| 3,682,840 | 8/1972 | Van Loan | 252—518 |

JOHN D. WELSH, Primary Examiner

U.S. Cl. X.R.

252—521; 117—229